(12) United States Patent
Hsu

(10) Patent No.: US 7,788,817 B2
(45) Date of Patent: Sep. 7, 2010

(54) RULER

(76) Inventor: Nick Hsu, 8F-1, No. 424, Chungming Rd., Taichung (TW)

( * ) Notice: Subject to any disclaimer, the term of this patent is extended or adjusted under 35 U.S.C. 154(b) by 102 days.

(21) Appl. No.: 12/235,651

(22) Filed: Sep. 23, 2008

(65) Prior Publication Data

US 2010/0071221 A1 Mar. 25, 2010

(51) Int. Cl.
*G01B 3/04* (2006.01)
*B43L 7/00* (2006.01)

(52) U.S. Cl. .......................................... 33/483; 33/484

(58) Field of Classification Search .................. 33/483, 33/484, 489, 492, 493, 494; D10/71
See application file for complete search history.

(56) References Cited

U.S. PATENT DOCUMENTS

| 332,958 | A | * | 12/1885 | Smith | 33/485 |
|---|---|---|---|---|---|
| 2,245,469 | A | * | 6/1941 | Ecklund et al. | 7/163 |
| 2,486,748 | A | * | 11/1949 | Koenig | 235/70 R |
| 3,832,782 | A | * | 9/1974 | Johnson et al. | 33/451 |
| 3,896,554 | A | * | 7/1975 | Pacion | 33/489 |
| 5,079,851 | A | * | 1/1992 | Sill | 33/760 |
| 5,461,795 | A | * | 10/1995 | Kok | 33/483 |
| 5,509,212 | A | * | 4/1996 | Henricksen | 33/565 |
| D422,517 | S | * | 4/2000 | Danon | D10/71 |
| 7,032,319 | B2 | * | 4/2006 | Ollgaard et al. | 33/483 |
| 2005/0135086 | A1 | * | 6/2005 | Meng | 362/125 |
| 2007/0011897 | A1 | * | 1/2007 | Verdura et al. | 33/484 |

FOREIGN PATENT DOCUMENTS

| GB | 2065566 A | * | 7/1981 |
|---|---|---|---|
| JP | 2001021301 A | * | 1/2001 |

* cited by examiner

*Primary Examiner*—R. A. Smith
(74) *Attorney, Agent, or Firm*—Frenkel & Associates, PC

(57) ABSTRACT

A ruler has a base, a design paper and a cover. The base has a ridge, a first inclined sheet, a second inclined sheet, a first horizontal tab and a second horizontal tab. The first inclined sheet is formed on the ridge. The first horizontal tab is formed on the first inclined sheet and has a top surface and multiple scales. The scales are formed on the top surface or the bottom surface. The second inclined sheet is formed on the ridge. The second horizontal tab is formed on the second inclined sheet. The design paper is mounted on the base. The cover is transparent, is mounted detachably on the base and covers the design paper. The design of the ruler can be replaced and the scales are not abraded easily.

18 Claims, 6 Drawing Sheets

_US 7,788,817 B2_

RULER

BACKGROUND OF THE INVENTION

1. Field of the Invention

The present invention relates to a ruler, especially to be a ruler being convenient for use.

2. Description of the Prior Arts

With reference to FIG. 6, a ruler (90) in accordance with the prior art has a bottom surface, an edge, multiple scales (91) and a design and may be flat shape. The scales (91) are formed respectively on the bottom surface and abut the edge. The design is formed on the bottom surface of the ruler.

People do not hold and use the ruler easily because the ruler is flat shape. Furthermore, the scales and the design formed on the bottom surface of the ruler are abraded easily. After repeatedly abraded, the scales are blurred and even disappear so that the ruler becomes unsightly and cannot perform accurate indication.

To overcome the shortcomings, the present invention provides a ruler to mitigate or obviate the aforementioned problems.

SUMMARY OF THE INVENTION

The main objective of the present invention is to provide a ruler being convenient for use.

A ruler in accordance with the present invention has a base, a design paper and a cover. The base has a longitudinal ridge, a first inclined sheet, a second inclined sheet, a first horizontal tab and a second horizontal tab. The first inclined sheet is formed on the ridge. The first horizontal tab is formed on the first inclined sheet and has a top or bottom surface and multiple scales. The scales are formed on the top surface of the first horizontal tab. The second inclined sheet is formed on the second edge of the ridge. The second horizontal tab is formed on the second inclined sheet. The design paper is mounted on the base. The cover is transparent, is mounted detachably on the base and covers the design paper. The design of the ruler can be replaced and the scales are not abraded easily.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
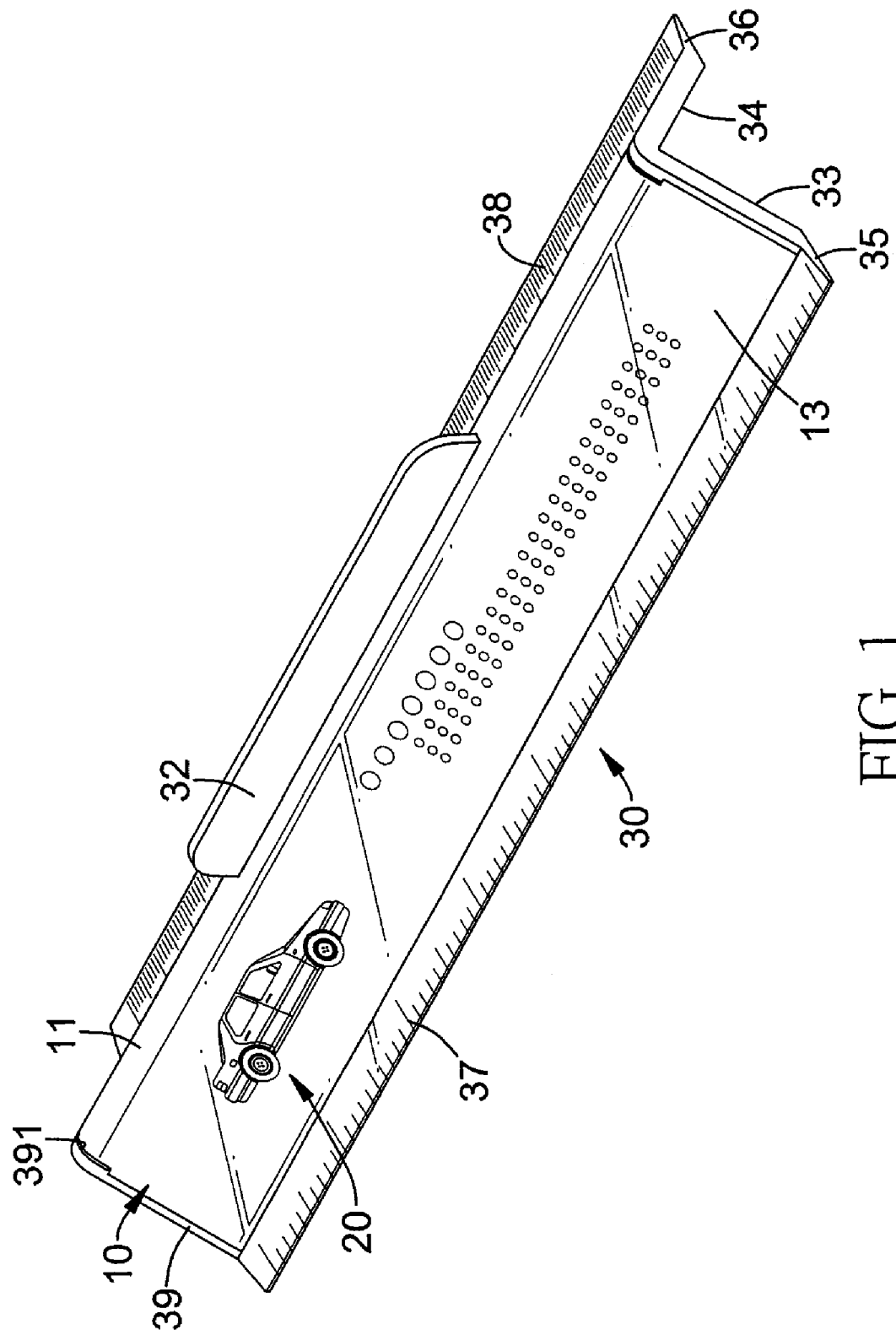
FIG. 1 is a perspective view of a ruler in accordance with the present invention.
Figure 2:
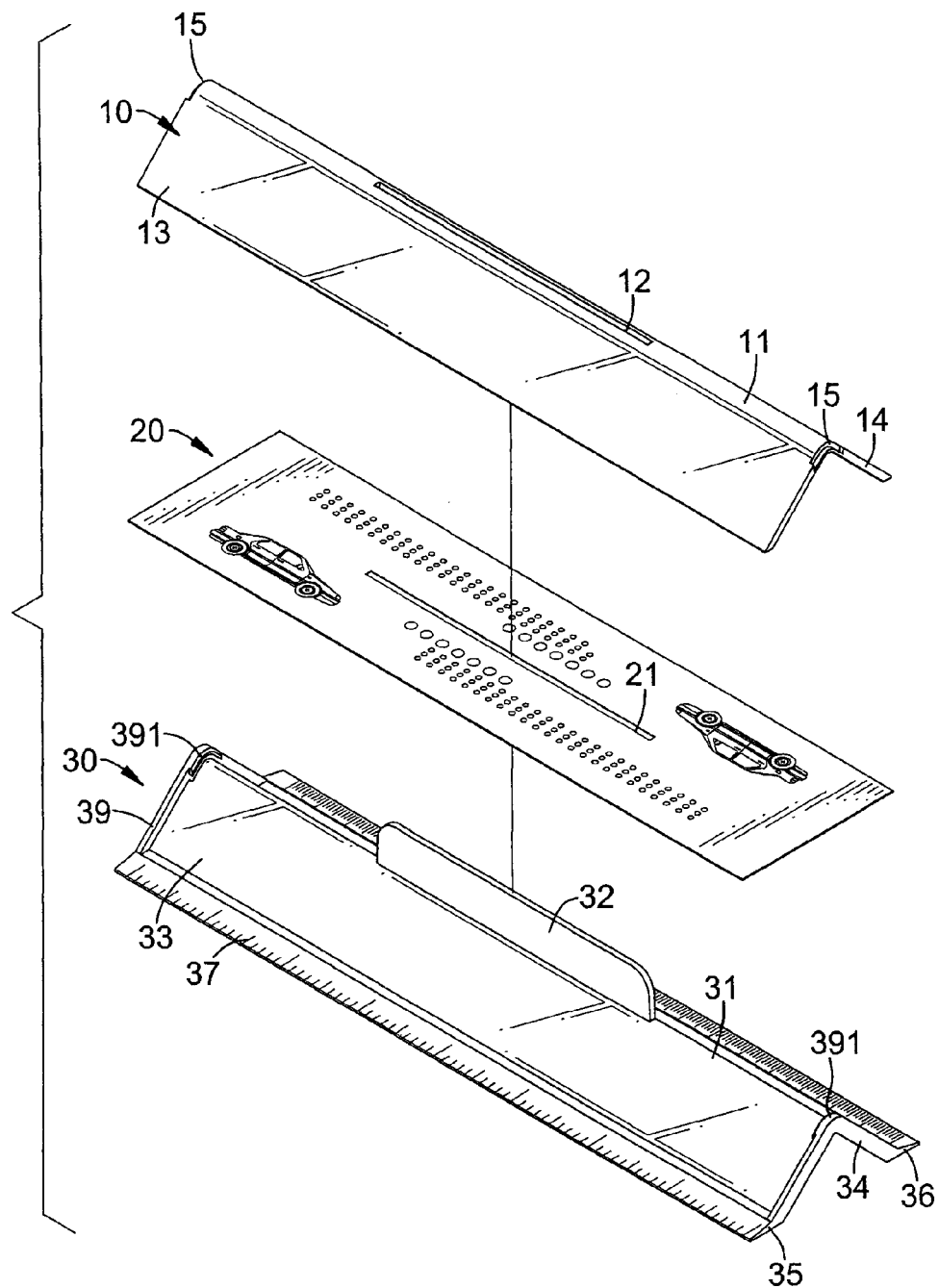
FIG. 2 is an exploded perspective view of the ruler in FIG. 1.

With reference to FIGS. 1 and 2, a ruler in accordance with the present invention has a base (30), a design paper (20) and a cover (10).

The base (30) has two edges, a ridge (31), a holder (32), a first inclined sheet (33), a second inclined sheet (34), a first horizontal tab (35), a second horizontal tab (36) and two protrudes (39).

The ridge (31) is longitudinal and has two opposite edges. The holder (32) is formed centrally on and protrudes up from the ridge (31).

The first inclined sheet (33) is formed on one of the edges of the ridge (31) and has an outside edge.

The second inclined sheet (34) is formed on the other of the edges of the ridge (31) and has an outside edge.

The first tab (35) is formed on the outside edge of the first inclined sheet (33) and has a top surface, a bottom surface and multiple scales (37). The bottom surface lies on a first inclined plane (351). The scales (37) may be formed on the top surface of the first tab (35) or the bottom surface of the first tab (35).

The second tab (36) is formed on the outside edge of the second inclined sheet (34) and has a top surface, a bottom surface and multiple scales (38). The bottom surface of the second inclined sheet (34) lies on a second inclined plane (361). The scales (38) are formed on the top surface of the second tab (36) or the bottom surface of the second tab (36). The first inclined plane (351) and the second inclined plane (361) intersect to form an included angle (θ). The included angle (θ) is smaller than 180° so that the bottom surfaces of the first and second tabs (35, 36) would not entirely contact a top of a table when the ruler is placed on the table. Thus, the scales (37, 38) on the bottom surfaces of the first and second tabs (35, 36) would not be worn.

Each protrude (39) is formed perpendicularly on the edge of the base (30) and has a resilient hook (391). The resilient hook (391) is formed on the protrude (39) and abuts the ridge (31).

The design paper (20) is mounted on the base (30) and has a slit (21) and an outer surface.

The slit (21) is defined through the design paper (20) and is mounted around the holder (32) of the base (30).

The outer surface of the design paper (20) has a design such as pictures, words, combination thereof or the like.

The cover (10) is transparent, is mounted detachably on the base (30), covers the design paper (20) and has two ends, a spine (11), two sheets (13, 14) and two recesses (15) formed on the two ends of the cover (10).

The spine (11) is longitudinal and has two side edges and an elongated hole (12). The elongated hole (12) is defined centrally in the spine (11), is mounted around the holder (32) of the base (30) and has two opposite ends. The ends of the elongated hole (12) presses respectively against the resilient arms (320) extending in the elongated hole (12) and are hooked by the hooks (321) prevent the cover (10) and the design paper (20) from separating from the base (30).

The sheets (13, 14) are formed respectively on the side edges of the spine (11) and correspond respectively to the first inclined sheet (33) and the second inclined sheet (34).

Figure 3:
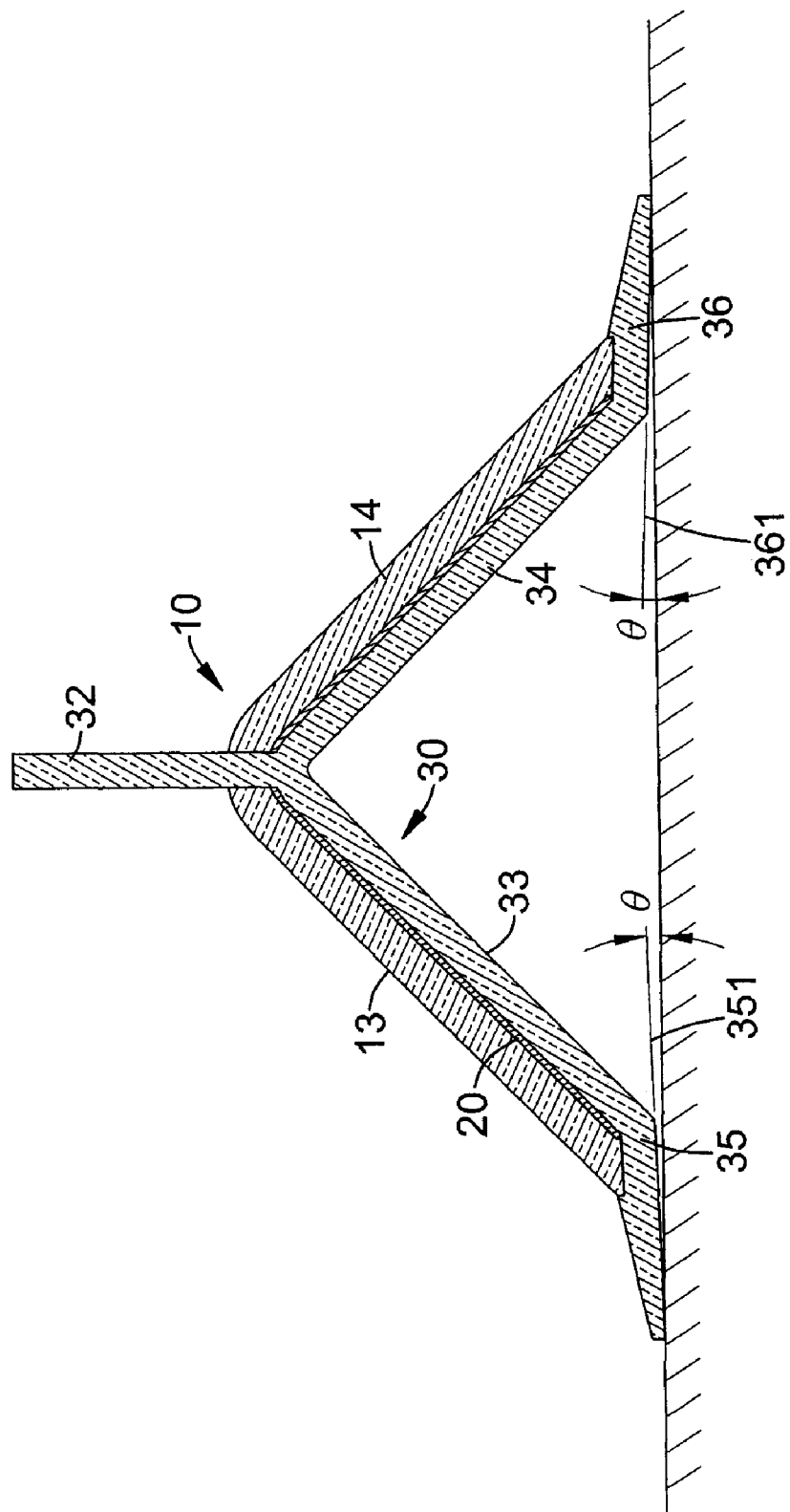
FIG. 3 is a cross sectional side view of the ruler in FIG. 1.
Figure 4:
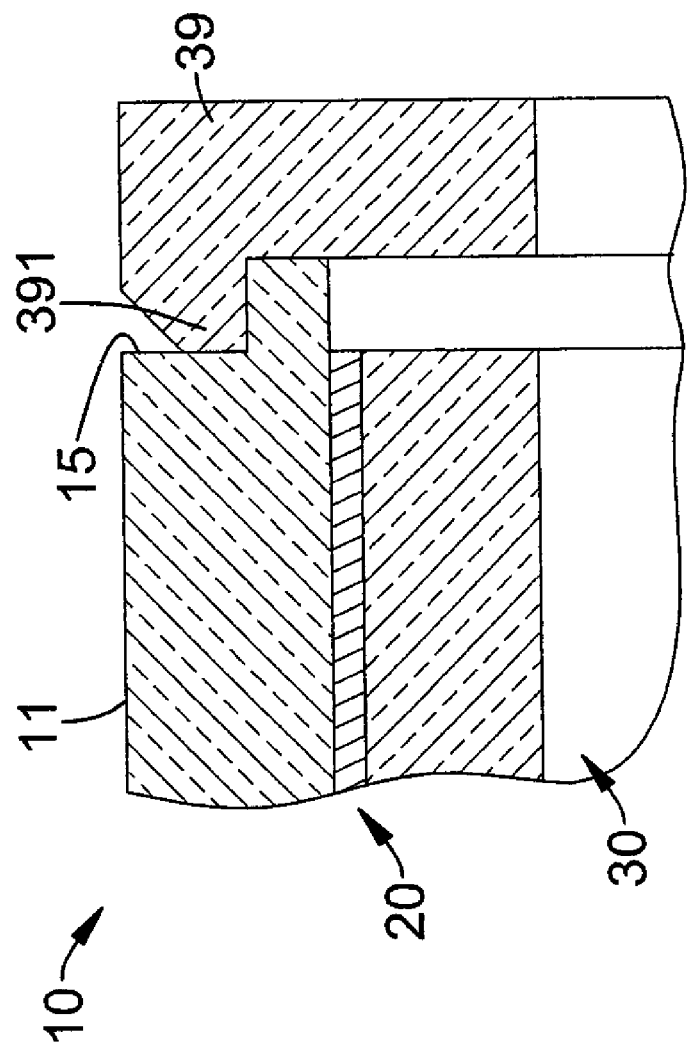
FIG. 4 is a cross sectional side view of the ruler in FIG. 1.
Figure 5B:
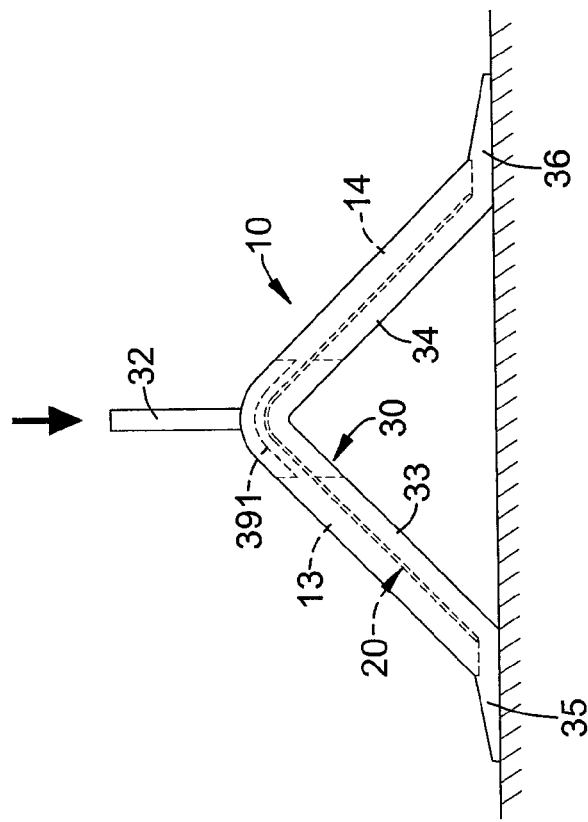
FIG. 5B is an operational side view of the ruler in FIG. 1 showing that the ruler is depressed downwards.
Figure 5A:
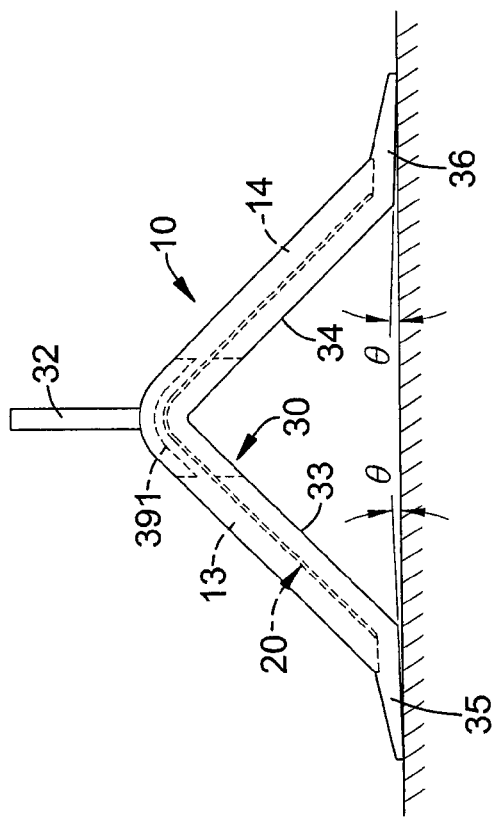
FIG. 5A is a side view of the ruler in FIG. 1 showing that the ruler is placed on a table.
Figure 6:
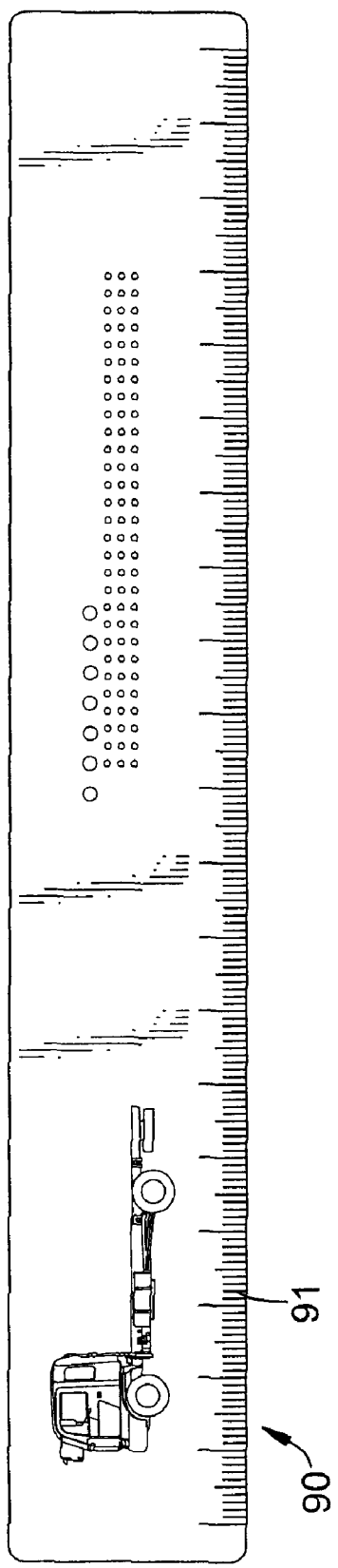
FIG. 6 is a front view of a ruler in accordance with the prior art.

With further reference to FIGS. 3 and 5, when the cover (10) is mounted on the base (30), the resilient hook (391) of the protrude (39) of the base (30) avoids the cover (30) to separate from the base (30). When replacing the design of the design paper (20), the user only has to compress the holder (32) to detach the cover (10) and the design paper (20). Therefore, the ruler in accordance with the present invention has following three advantages:

1. The design paper (20) of the ruler can be replaced and not abraded easily.

2. The scales (37, 38) are not abraded easily because the scales (37, 38) are formed on the top surface of the first tab

(35) and the second tab (36) or formed on the inclined bottom surfaces of the first tab (35) and the second tab (36).

3. When the ruler is used by a user, the user can easily position the ruler. The user can catch the holder (32) to move the ruler and press the ruler to position the ruler on a paper.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A ruler having
   a base having
      a ridge having two opposite edges;
      a first inclined sheet being formed on one of the edges of the ridge and having an outside edge;
      a second inclined sheet being formed on the other of the edges of the ridge and having an outside edge;
      a first tab being formed on the outside edge of the first inclined sheet and having a top surface and a bottom surface; and
      a second tab being formed on the outside edge of the second inclined sheet and having a top surface and a bottom surface;
   a design paper being mounted on the base and having an outer surface having a design; and
   a cover mounting detachably on the base, covering the design paper and having
      a spine having two side edges; and
      two sheets being formed respectively on the edges of the spine and corresponding respectively to the first inclined sheet and the second inclined sheet.

2. The ruler as claim 1, wherein multiple scales are formed on the top surface of the first tab.

3. The ruler as claim 2, wherein multiple scales are formed on the bottom surface of the first tab.

4. The ruler as claim 3, wherein:
   the base further has a holder being formed centrally on the ridge; and
   the design paper further has a slit being formed on the design paper and mounted around the holder of the base.

5. The ruler as claim 4, wherein the base further has
   two protrudes being respectively formed perpendicularly on the edges of the base and each protrude having
      a resilient hook being formed on the protrude and abutting the ridge; and
   the cover further has
      two ends; and
      two recesses being formed on the two ends of the cover and corresponding to the resilient hooks of the base.

6. The ruler as claim 5, wherein:
   the bottom surface of the first tab lies on a first inclined plane;
   the bottom surface of the second tab lies on a second inclined plane; and
   the first and second inclined planes intersect to form an included angle being smaller than 180°.

7. The ruler as claimed in claim 6, wherein multiple scales are formed on the top surface of the second tab.

8. The ruler as claimed in claim 6, wherein multiple scales are formed on the bottom surface of the second tab.

9. The ruler as claim 2, wherein:
   the base further has a holder being formed centrally on the ridge; and
   the design paper further has a slit being formed on the design paper and mounted around the holder of the base.

10. The ruler as claim 9, wherein the base further has
    two protrudes being respectively formed perpendicularly on the edges of the base and each protrude having a resilient hook being formed on the protrude and abutting the ridge; and
    the cover further has
       two ends; and
       two recesses being formed on the two ends of the cover and corresponding to the resilient hooks of the base.

11. The ruler as claim 10, wherein:
    the bottom surface of the first tab lies on a first inclined plane;
    the bottom surface of the second tab lies on a second inclined plane; and
    the first and second inclined planes intersect to form an included angle being smaller than 180°.

12. The ruler as claimed in claim 11, wherein multiple scales are formed on the top surface of the second tab.

13. The ruler as claimed in claim 11, wherein multiple scales are formed on the bottom surface of the second tab.

14. The ruler as claim 1, wherein:
    the base further has a holder being formed centrally on the ridge; and
    the design paper further has a slit being formed on the design paper and mounted around the holder of the base.

15. The ruler as claim 14, wherein the base further has
    two protrudes being respectively formed perpendicularly on the edges of the base and each protrude having
       a resilient hook being formed on the protrude and abutting the ridge; and
    the cover further has
       two ends; and
       two recesses being formed on the two ends of the cover and corresponding to the resilient hooks of the base.

16. The ruler as claim 15, wherein:
    the bottom surface of the first tab lies on a first inclined plane;
    the bottom surface of the second tab lies on a second inclined plane; and
    the first and second inclined planes intersect to form an included angle being smaller than 180°.

17. The ruler as claimed in claim 16, wherein multiple scales are formed on the top surface of the second tab.

18. The ruler as claimed in claim 16, wherein multiple scales are formed on the bottom surface of the second tab.

* * * * *